UNITED STATES PATENT OFFICE.

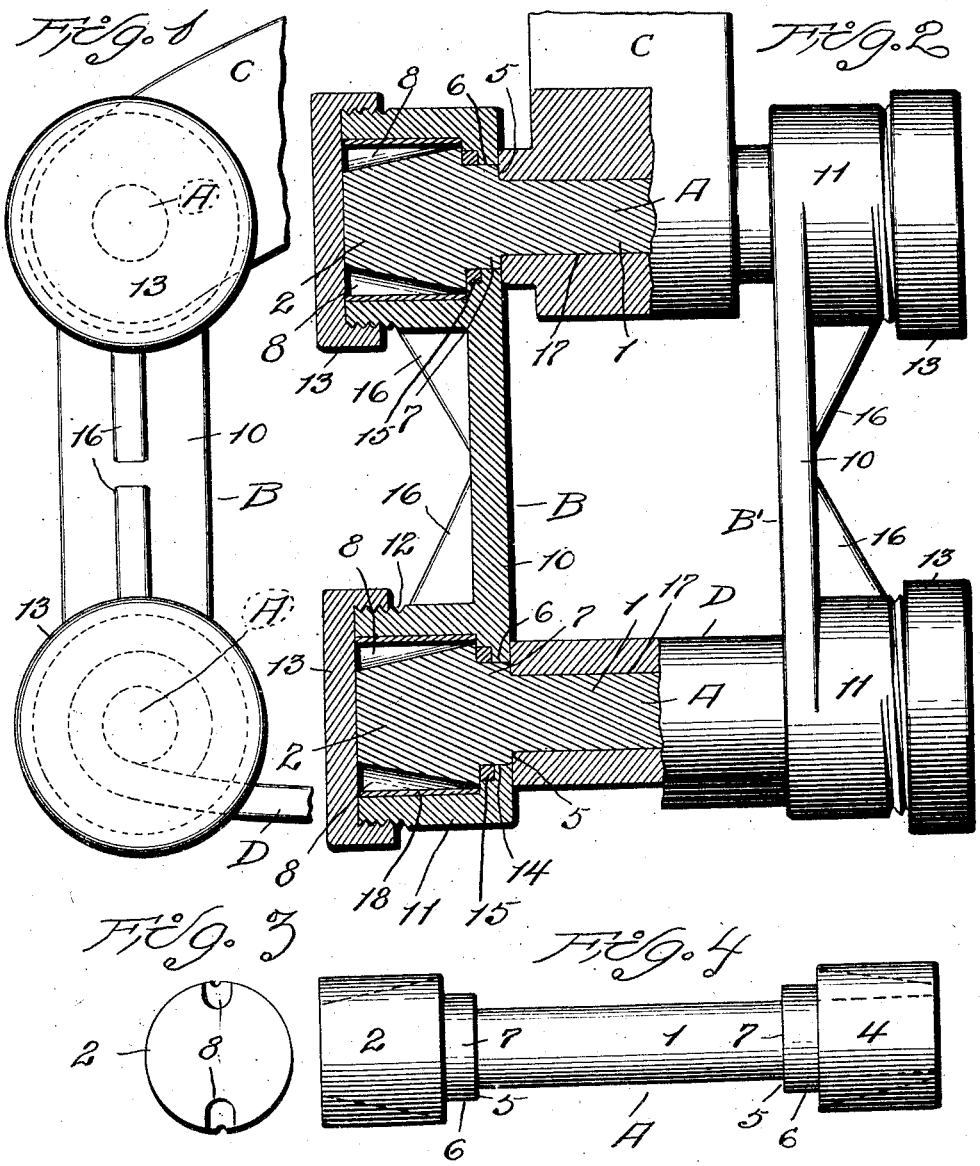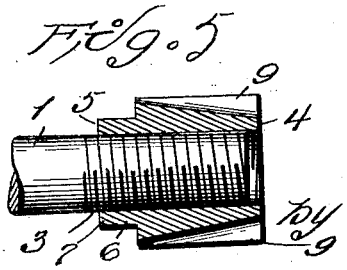

HARRY B. McCANDLESS, OF ST. LOUIS, MISSOURI.

SHACKLE.

1,407,942.   Specification of Letters Patent.   Patented Feb. 28, 1922.

Application filed August 19, 1920. Serial No. 404,699.

*To all whom it may concern:*

Be it known that I, HARRY B. McCANDLESS, a citizen of the United States, residing at the city of St. Louis, State of Missouri, have invented a certain new and useful Improvement in Shackles, of which the following is a specification, reference being had to the accompanying drawing, forming a part thereof.

This invention relates to a certain new and useful improvement in shackles adapted for use in automobiles and other machinery.

The principal objects of my present invention are to provide a shackle so constructed as to be conveniently lubricated and its maintenance in efficient lubricated condition facilitated, whereby squeaks and rattles are largely obviated and wear upon the parts reduced; to provide a shackle which will efficiently and durably connect and fasten parts together in a manner permitting free and easy hinged or pivotal movement therebetween; to provide a shackle which can be readily and easily assembled or, when required, taken apart for replacements or repairs; to provide a shackle which may be inexpensively and cheaply manufactured and produced, and to generally improve upon, and simplify the construction of, devices of the kind described.

With the above and other objects in view, my invention resides in the novel features of form, construction, arrangement, and combination of parts hereinafter described and afterwards pointed out in the claims.

In the accompanying drawing,

Figure 1 is a side elevational view of a shackle embodying my invention, the shackle being illustrated as operatively or hingedly connecting an automobile chassis and spring, both the latter being fragmentally shown;

Figure 2 is an elevational view, partly in section, of the shackle, the same being similarly shown as hingedly connecting an automobile chassis and spring;

Figure 3 is an end view of one of the shackle-bolts;

Figure 4 is a side elevational view of one of the shackle-bolts and its nut; and Figure 5 is a fragmental view of the shank of one of the shackle-bolts, showing its nut in longitudinal section.

Referring now more in detail to the said drawing, in which like reference characters refer to like parts throughout the several views, the shackle includes a pair of similar bolts A—A and a pair of similar links B—B'.

Each bolt A comprises a preferably cylindrical shank or body-portion 1 integrally formed at one end with a bearing head 2, circular or annular in shape in end elevation, as shown in Figure 3, the other or opposite end of the shank 1 being threaded, as at 3, as seen in Figure 5, to receive a bearing nut 4 approximately identical in form and size with bolt-head 2. Bolt-head 2 preferably has a diameter considerably greater than the diameter of shank 1, as seen in Figures 2 and 5; and immediately adjacent the base of head 2, shank 1 is preferably enlarged to provide an annular shoulder 5 and a link-fitting surface 6. For the purpose of providing a similar shoulder 5 and link-fitting surface 6 at the opposite or threaded end of the bolt, the nut 4 is provided with a reduced annular extension 7. For purposes shortly appearing, bolt-head 2 is longitudinally formed or cut-away to provide preferably diametrically opposite channels or ways 8—8, preferably of gradually increasing depth from the base of the head towards its outer end, as clearly seen in Figure 2. Similarly, nut 4 is formed or provided with identically similar longitudinally disposed channels or ways 9—9, clearly seen in Figure 5.

Each link B—B' comprises a shank or body-portion preferably in the form of a suitably elongated substantially rectangular flat strip 10, suitably formed or provided upon one side and at the opposite ends of which are outwardly presented cup-bearings 11—11 of interior dimensions to conveniently fit for movement upon bolt-head 2 and nut 4, the wall of each cup 11 being externally threaded, as at 12, to receive a flanged closure-cap 13. At the base of each cup 11, strip or shank 10 is annularly cut-away to provide an aperture or opening 14 having a diameter slightly greater than, and for freely or loosely accommodating the portions 6—7 of the bolt and nut, and providing a bearing for the wall of each aperture 14 being suitably recessed to receive and accommodate a suitable felt or other grease-retaining washer 15. As seen in Figure 2, the cups 11 and strip 10 are suitably braced or connected by strengthening-webs 16.

For purposes of illustration, I herein show and describe my new shackle in connection with an automobile, of which C is an endportion of the chassis and D one of the springs, which parts are to be pivotedly or hingedly linked or connected together, frame C and spring D being each, as is common in automobile construction, formed or provided transversely with a suitable bolt-opening or way 17—17.

In use or operation, and in assembling the shackle, a bolt A is first projected at its threaded end through the aperture 14 of the link B, then through the frame C, and then through the opposite link B', with its head 2 disposed in cup 11 of the link B. Similarly, the other bolt A is projected at its threaded end through the other aperture 14 of the link B, then through the opening 17 of the spring D, and then through the other opening 14 of the link B', its head 2 being likewise disposed in and providing a bearing for the other cup 11 of the link B. Nuts 4 are then fitted upon the threaded ends of the bolts A and similarly disposed within and providing bearings for the cups 11 of the link B', with the link-bearing extensions 7 thereof disposed within the apertures 14 of the link B'. The diameter of the shanks of the bolts A relatively to the diameter of the openings 17 is such that the bolts A have a drive, tight fit in the openings 17. Consequently, with the shackle assembled as described, the frame C and spring D are tightly held between the shoulders 5 of the bolts A and their nuts 4, with the links B—B' hingedly bearing at their cups 11 upon the heads and nuts of the bolts A. Thus wear upon the parts C and D is done away with and thrown entirely upon the heads and nuts of the bolts A.

The channels 8 and 9 of bolt heads 2 and nuts 4 provide convenient ways for suitable grease or other lubricant, which gradually works around the heads and nuts of the bolts any excess lubricant being absorbed by the washers 15 disposed, as shown, between the shank fitting portions 6 and the links B.

By the construction described, I am enabled not only to conveniently lubricate the shackle and its associated parts, but to also facilitate the maintenance of such parts in lubricated condition and to greatly obviate squeaks and rattles and reduce wear upon the parts. Further, the shackle and its parts may be readily assembled or, when required, taken apart for replacements or repairs. The shackle itself is simple in form and construction and yet strong and rigid and serves to efficiently and durably connect the parts together, while freely permitting hinged or pivotal movement therebetween for comfortable riding.

The caps 13 are readily removable when lubrication of the parts is desired, and are, of course, fitted in closing position upon the cups after lubrication to prevent the entrance into the cups of dust, dirt, and the like; and I might add that, as I have here illustrated in Figure 2, an annular wear bushing 18 is preferably fitted in each cup 11 to protect the bolt-heads and nuts.

I am aware that minor changes in the form, construction, arrangement and combination of the several parts of the shackle may be made and substituted for those herein shown and described without departing from the nature and principle of my invention.

Having thus described my invention, what I claim and desire to secure by Letters Patent is:

1. A shackle including a pair of headed bolts and nuts therefor, said heads and nuts being annular in form and being concentric with, but of increased diameter relatively to, the shanks of the bolts, the bolts being adapted for rigid engagement at their shanks with the parts to be shackled, in combination with a pair of independent separate links adapted for hingedly connecting the bolts and said parts together, the links being apertured to loosely fit the shanks of the bolts upon opposite sides of the shackled parts, and a pair of spaced outwardly presented annular cups on each of the links, said cups snugly embracing, and the links having a bearing for pivotal movement at said cups upon, the heads and nuts of the bolts.

2. A shackle including a pair of headed bolts and nuts therefor, said heads and nuts being annular in form and being concentric with, but of increased diameter relatively to, the shanks of the bolts, the bolts being adapted for rigid engagement at their shanks with the parts to be shackled, in combination with a pair of independent separate links adapted for hingedly connecting the bolts and said parts together, the links being apertured to loosely fit the shanks of the bolts upon opposite sides of the shackled parts, and a pair of spaced outwardly presented annular cups on each of the links, said cups snugly embracing, and the links having a bearing for pivotal movement at said cups upon, the heads and nuts of the bolts, each head and nut being provided longitudinally with peripheral ways whereby lubricant may be directed to and upon the bearing surfaces between the cups and said heads and bolts.

3. A shackle including a pair of headed bolts and nuts therefor, said heads and nuts being annular in form and being concentric with, but of increased diameter relatively to, the shanks of the bolts, the bolts being adapted for rigid engagement at their shanks with the parts to be shackled, in combination with a pair of independent separate links adapted for hingedly connecting the bolts and said parts together, the links being apertured to loosely fit the shanks of the bolts upon opposite sides of the shackled parts, a pair of spaced outwardly presented annular cups on each of the links, said cups snugly embracing, and the links having a bearing for pivotal movement at said cups upon, the heads and nuts of the bolts, each head and nut being provided longitudinally with peripheral ways whereby lubricant may be directed to and upon the bearing surfaces between the cups and said heads and bolts, and caps for removably closing the cups against the ingress of dust and the like thereinto.

4. A shackle including a pair of headed bolts and nuts therefor, said heads and nuts being annular in form and being concentric with, but of increased diameter relatively to, the shanks of the bolts, the shank of each bolt being provided next its head and nut with annular link fitting surfaces, and being adapted for rigid engagement between said link fitting surfaces with the parts to be shackled, in combination with a pair of independent separate links adapted for hingedly connecting the bolts and said parts together, the links being apertured to loosely fit the link fitting surfaces of the shanks of the bolts, and outwardly presented annular cups on each of the links, said cups snugly embracing, and the links having a bearing for pivotal movement at said cups upon, the heads and nuts of the bolts.

5. A shackle including a pair of headed bolts and nuts therefor, said heads and nuts being annular in form and being concentric with, but of increased diameter relatively to, the shanks of the bolts, the shank of each bolt being provided next its head and nut with annular link fitting surfaces, and being adapted for rigid engagement between said link-fitting surfaces with the parts to be shackled, in combination with a pair of independent separate links adapted for hingedly connecting the bolts and said parts together, the links being apertured to loosely fit the link-fitting surfaces of the shanks of the bolts, and outwardly presented annular cups on each of the links, said cups snugly embracing, and the links having a bearing for pivotal movement at said cups upon, the heads and nuts of the bolts, each head and nut being provided longitudinally with peripheral ways whereby lubricant may be directed to and upon the bearing surfaces between the cups and said heads and bolts.

In testimony whereof, I have signed my name to this specification.

HARRY B. McCANDLESS.